United States Patent Office 3,127,380
Patented Mar. 31, 1964

3,127,380
ORGANOBORON POLYMERIZATION CATALYSTS
Frank J. Welch, South Charleston, W. Va., assignor to Union Carbide Corporation, a corporation of New York
No Drawing. Filed Apr. 5, 1960, Ser. No. 19,996
11 Claims. (Cl. 260—85.5)

The present invention relates to the polymerization of ethylenically unsaturated monomers. More particularly, this invention relates to a novel catalytic process for the polymerization of certain ethylenically unsaturated monomers.

Heretofore, it has been known that the polymerization of vinyl monomers, such as vinyl acetate, ethyl acrylate, ethyl methacrylate, acrylonitrile and the like, can be catalyzed by contact with the free radicals produced by the thermal decomposition of substances such as peroxides and azo compounds. In general, however, when these free radical-producing compounds are employed, it is essential to carry out the polymerization reactions at above ambient temperature so that the thermal decomposition required for the production of the free radicals will take place to an appreciable extent. Thus, the operating conditions under which the free radical-catalyzed polymerizations can be carried out on a commercial basis are considerably limited. Another disadvantage particularly attending the use in polymerization reactions of peroxide-type free radical-producing compounds, such as benzoyl peroxide, hydrogen peroxide, lauroyl peroxide, and the like, lies in the fact that these peroxides, or their residues, may oxidize the polymeric product that is formed, thereby resulting in the discoloration of the polymer as well as engendering other deleterious changes in the properties of the polymer. Such compounds may also alter the color of many dyestuffs commonly added to the reaction mixture after polymerization. It has also been found that many of the free radical-producing compounds are, unfortunately, highly unstable and are necessarily stored at very low temperatures prior to use, or prepared in situ; still others are sensitive to shock and therefore require considerable care in handling.

In addition to the free radical-producing compounds hereinabove described, many other catalysts presently employed in the polymerization of vinyl monomers, such as metal alkyls and mixtures containing metal alkyls in combination with metal halides, engender the formation of polymeric products containing difficultly removable residues. The presence of such residues often prevents the direct utilization of the polymeric products in many applications, as for instance, in the production of films or fibers.

The aforementioned disadvantages can now be overcome to a substantial extent through the practice of the present invention whereby one or more of the following objects can be achieved.

It is a principal object of this invention to provide a novel catalytic process for the polymerization of certain ethylenically unsaturated monomers. It is another object of this invention to provide novel catalysts for the polymerization of certain ethylenically unsaturated monomers which are operable over a broad temperature range. A further object of this invention is to provide polymers of certain ethylenically unsaturated monomers which are essentially devoid of objectionable residues. Still other objects will appear in connection with the following description.

In its broadest aspect, the present invention depends upon the discovery that certain monomers containing at least one non-aromatic ethylenically unsaturated group can be polymerized by contacting the monomer under polymerizing conditions, as hereinbelow described, with a catalytic quantity of an organoboron compound having the general formula:

$$BR_mX_n$$

wherein R designates a monovalent hydrocarbon radical, as for instance, an aliphatic radical, and particularly an alkyl radical, preferably containing from two to about twelve carbon atoms, or a cycloaliphatic radical, and particularly a cycloalkyl radical, preferably containing from three to about twelve carbon atoms; X designates a halogen atom; $m$ and $n$ designate integers from one to two; and wherein the sum of the integers designated by $m$ and $n$ (i.e., $m$ plus $n$) is a value of three. Illustrative of the monovalent hydrocarbon radicals designated above by R are methyl, ethyl, isopropyl, butyl, butenyl, neopentyl, 2-ethylhexyl, decyl, dodecyl, methylcyclopentyl, cyclopentyl, cyclohexyl, cyclohexenyl, ethylcyclohexyl radicals, and the like. Illustrative of the halogen atoms designated above by X are chlorine, fluorine, bromine atoms, and the like. It is to be noted in this connection that hereinafter, unless otherwise explicitly indicated, the term "aliphatic radical" is intended to include acyclic aliphatic radicals as well as cycloaliphatic radicals. Similarly, the term "alkyl radical" is intended to include acyclic alkyl radicals as well as cycloalkyl radicals.

Among the organoboron compounds which are suitable for use as polymerization catalyst in the process of this invention there can be mentioned the following: dimethylboron chloride, diethylboron chloride, dibutylboron bromide, dibutenylboron chloride, di-2-ethylhexylboron fluoride, didodecylboron chloride, dicyclopentylboron chloride, dicyclohexylboron bromide, dicyclohexanylboron chloride, di(ethylcyclohexyl)boron chloride, ethylboron dichloride, butylboron dibromide, butenylboron dichloride, 2-ethylhexylboron difluoride, dodecylboron dichloride, cyclopentylboron dichloride, cyclohexylboron dibromide, cyclohexenylboron dichloride, ethylcyclohexylboron dichloride. The preferred catalysts of this invention are the acyclic dialkylboron halides and the acyclic alkylboron dihalides, of which the dibutylboron halides and the butylboron dihalides are especially preferred.

The broad range of ethylenically unsaturated monomers contemplated by this invention can be defined more clearly as the compounds having the general formula:

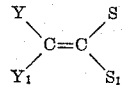

wherein Y and $Y_1$ each designates either a hydrogen or a halogen atom, S designates a member of the class consisting of hydrogen and halogen atoms and the alkyl radicals preferably containing from one to about four carbon atoms, of which methyl and ethyl radicals are especially preferred, and $S_1$ designates a substituent, i.e., atom or radical, characterized by having a positive para-sigma value, as defined by Hammett ("Physical Organic Chemistry," McGraw-Hill Book Company, 1940, pages 184 to 188), of at least 0.3. As so defined, the para-sigma value of a substituent can be obtained from the equation:

Para-sigma value $(\sigma) = \log K_1 - \log K_1°$ wherein $K_1$ designates the ionization constant of the benzoic acid derivative containing the substituent in the para-position of the benzoic acid molecule, and $K_1°$ designates the ionization constant of unsubstituted benzoic acid.

It has been found that the greater the para-sigma value of the substituent designated above by $S_1$, other factors being constant, the more readily will the ethylenically unsaturated monomer be polymerized by contact with the organoboron catalysts of this invention. Accordingly, the ethylenically unsaturated monomers contemplated by this invention can possess a substituent designated by $S_1$ having a positive para-sigma value in the range of from 0.3 to about 1.3, or even higher. Illustrative of the substituents which have a positive para-sigma value of at least 0.3, to mention but a few, are —CN, —COOH, —COOR', —COR', —CONH$_2$, —CONR'$_2$, —OCOR', and —SOOR', wherein R' designates an alkyl, alkoxyalkyl, cyanoalkyl, or haloalkyl radical, preferably containing from one to about eighteen carbon atoms or slightly higher. Among the substituents which, on the other hand, have a para-sigma value of less than 0.3, and therefore excluded from the radicals designated by $S_1$, are the alkyl and alkoxy radicals and halogen and hydrogen atoms. It has also been found of importance to this invention that the substituent designated by $S_1$ have a positive para-sigma value of at least about 0.4 when S designates an alkyl radical, other ethylenically unsaturated monomers ordinarily being inoperable in the process of this invention. Thus, when S designates an alkyl radical, $S_1$ can be —CN, —COOH, —COOR', —CONH$_2$, —CONR'$_2$, —COR' or —SOOR', etc., wherein R' is as defined above. Illustrative of the substituents having a positive para-sigma value of at least 0.3 but less than about 0.4, and therefore excluded from the radicals designated by $S_1$ when S designates an alkyl radical, are the acyloxy (—OCOR') radicals wherein R' is as defined above.

As typical of the ethylenically unsaturated monomers which can be polymerized in accordance with the process of this invention there can be mentioned the following: acrylyl and alkylacrylyl compounds, particularly acrylic, haloacrylic and methacrylic acids and esters and acrylyl and alkylacrylyl nitriles and amides, such as alpha-chloroacrylic acid, ethyl acrylate, cyanoethyl acrylate, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, chloroethyl methacrylate, acrylonitrile, methacrylamide, acrylamide, N,N-diethyl acrylamide, diethylaminopropyl acrylamide, N-methoxymethyl acrylamide, and the like; vinyl esters of alkyl or haloalkyl carboxylic acids, such as vinyl acetate, vinyl chloroacetate, vinyl propionate, vinyl trimethylacetate, vinyl hexanoate, vinyl laurate, vinyl stearate, and the like; other vinyl derivatives such as methyl vinyl ketone, methyl vinyl sulfone, and the like, etc. The ethylenically unsaturated monomers of this invention also include those compounds having a plurality of polymerizable ethylenic double bonds which are isolated with respect to each other, such as divinyl succinate, divinyl adipate, and the like. Also contemplated in this connection are compounds having one or more of the isolated ethylenic groups conjugated with a carboxylic group, such as vinyl acrylate, vinyl methacrylate, methacrylic anhydride, acrylic and substituted acrylic esters of polyhydric alcohols, such as ethylene glycol dimethacrylate, diethylene glycol dimethacrylate, triethylene glycol dimethacrylate, tetraethylene glycol dimethacrylate, diethylene glycol diacrylate, glyceryl triacrylate, polyethylene glycol dimethacrylates, and the like. Of the ethylenically unsaturated monomers mentioned above, the acrylic, haloacrylic, and methacrylic acids and esters, the acrylyl and alkylacrylyl nitriles and amides and the vinyl esters of alkyl haloalkyl carboxylic acids represent preferred monomers due to their ease of polymerization.

In addition, it is to be noted that monomeric mixtures containing two or more of the above-mentioned ethylenically unsaturated monomers can also be employed in accordance with this invention when a copolymeric product is desired. For example, among the copolymers that can be obtained when the process of this invention is employed using mixtures of the ethylenically unsaturated monomers there can be mentioned the copolymers of vinyl acetate with decyl acrylate, acrylonitrile, vinylidene chloride or methyl methacrylate; the copolymers of butyl acrylate with acrylamide or acrylonitrile; the copolymers of acrylamide with diethylaminopropylacrylamide; the copolymers of methacrylic acid with ethylene glycol dimethacrylate, and the like.

The function of the organoboron compounds herein described being that of a catalyst, any catalytic amount thereof can be used in the process of this invention. Most frequently, however, the organoboron catalyst is employed in a concentration of from about 0.03 percent to about 5 percent by weight based upon the weight of the ethylenically unsaturated monomer(s) present in the polymerization mixture, with the use of a catalyst concentration of from about 0.1 percent to about 3 percent by weight based on the weight of the ethylenically unsaturated monomer(s) being preferred. Somewhat lower catalyst concentrations can also be employed effectively, while the upper limit of catalyst concentration is merely one of economic consideration.

The process of this invention is generally and preferably carried out at a temperature in the range of from about 0° C. to about 100° C. The optimum temperatures for a particular polymerization, however, may vary within the broad range of from about —20° C. to about 200° C., depending upon the ethylenically unsaturated monomer(s) employed. Somewhat higher or lower polymerization temperatures can also be used.

The reaction period and pressure can also be varied broadly in accordance with the process of this invention. Thus, superatmospheric, subatmospheric or atmospheric pressure can be employed with good results as long as there is a sufficient concentration of monomer present. The polymerization can most conveniently be conducted at the autogenous pressures created in the reaction equipment that is employed, up to pressures of from about 50 atmospheres to about 3000 atmospheres, and can be conducted in a continuous manner in an agitator-equipped vessel at atmospheric pressure or at an elevated pressure in a tubular reaction. Alternatively, the polymerization can be conducted batchwise in a sealed autoclave or in any other convenient manner. The reaction period can vary from as little as five minutes or less, up to several days if desired. The longer the reaction period, of course, the more complete the polymerization, i.e., conversion of monomer to polymer.

In addition, the process of this invention can be carried out by bulk, suspension, emulsion or solution methods of polymerization, i.e., with or without a diluent. When a diluent is employed, it can serve as a solvent or simply as a suspending medium for either the catalyst, the reactant monomer(s) or the polymeric product. By way of illustration, the polymerization can be carried out in water in the presence of suspending or emulsifying agents such as esters of sulfonated dicarboxylic acids, e.g., dioctyl sodium sulfosuccinate (Aerosol OT) etc. Other organic diluents which can be used include alcohols, ketones, saturated aliphatic and aromatic hydrocarbons, ethers, alkyl and aryl halides, nitriles, amides, esters and the like. As typical of the suitable organic diluents there can be mentioned the following: methanol, acetone, heptane, toluene, benzene, diethyl ether, tetrahydrofuran, propylene oxide, ethylene dichloride, chlorobenzene, acetonitrile, dimethylformamide, ethyl acetate, and the like. However, as noted previously it is not necessary that a diluent be present. Thus, it will be apparent that the amount of diluent employed can be varied broadly in accordance with this invention. In general, however, it is desirable to have at least 1 percent by weight of monomer present in the diluent when the latter is employed, although this restriction is again one of economic consideration.

Since the organoboron catalysts of this invention tend to react with oxygen it is also desirable, although not essential, to conduct the polymerization in a substantially oxygen-free atmosphere. Thus, air is usually excluded by maintaining an inert atmosphere (e.g. nitrogen) or a vacuum in the reaction vessel. However, it is well known that polymerizable monomers and diluents such as are used in the process of this invention contain trace amounts of impurities such as oxygen. The concentration of molecular oxygen in these materials generally runs in the order of parts per million. Such low concentrations of oxygen have not been found deleterious to the process of this invention.

Upon completion of the polymerization, the polymeric product that is formed can be recovered by any convenient method known to those skilled in the art, such as by precipitation, centrifugation, etc. When in solution, the polymer may be precipitated, for example, by addition to an alcohol such as methanol, filtered and dried. Alternatively, when the polymeric product is formed as a solid, e.g., in a non-solvent environment, the product can be centrifuged or simply filtered and dried, the precipitation step being omitted. A polymeric product is thus obtained substantially free from any contaminating residue.

As employed herein the term "polymerization" includes within its scope the polymerization of a single monomer and the copolymerization of two or more monomers. Further, the term "polymer," unless otherwise indicated, refers herein to both homopolymers and copolymers, i.e., polymers produced from two or more monomers. The term "reduced viscosity" is well known in the art and designates a value obtained by dividing the specific viscosity of a solution of the polymer by the concentration of the polymer in the solution, the concentration being measured in grams of polymer per 100 milliliters of solvent; the specific viscosity is obtained by dividing the difference between the viscosity of the polymer solution and the viscosity of the pure solvent by the viscosity of the solvent. The reduced viscosity of a polymer is regarded as a measure of the molecular weight of the polymer, with higher values indicating higher molecular weights.

The invention can be illustrated further by the following specific examples of its practice but is not intended to be limited thereto.

*Example I*

A solution containing 0.3 milliliter of di-n-butylboron chloride in 30 milliliters of vinyl acetate was charged to a polymerization tube under a nitrogen atmosphere. The tube was subsequently capped and agitated in a water bath maintained at a temperature of 50° C. for a period of eighteen hours. A poly(vinyl acetate) product was formed and was precipitated by adding the cooled contents of the polymerization tube to about 100 milliliters of heptane. The precipitated polymer was then filtered, washed with heptane and dried. In this manner, 17 grams of poly(vinyl acetate) were recovered. The product had a reduced viscosity of 0.34 as measured from a benzene solution containing 0.2 gram of the polymer per 100 milliliters of benzene at a temperature of 30° C.

*Example II*

A solution containing 0.3 milliliter of di-n-butylboron chloride in 25 milliliters of methyl methacrylate was charged to a polymerization tube under a nitrogen atmosphere. The tube was subsequently capped and agitated in a water bath maintained at a temperature of 50° C. for a period of eighteen hours. A poly(methyl methacrylate) product was formed and was precipitated by adding the cooled contents of the polymerization tube to about 100 milliliters of methanol. The precipitated polymer was then filtered, washed with methanol and dried. In this manner, 7 grams of poly(methyl methacrylate) were recovered. The product had a reduced viscosity of 1.38 as measured from a benzene solution containing 0.2 gram of the polymer per 100 milliliters of benzene at a temperature of 30° C.

*Example III*

In a manner similar to that described in Example II, 0.1 gram of di-n-butylboron chloride, 2.0 grams of methyl methacrylate, and 8.0 grams of acrylonitrile were charged to a polymerization tube under a nitrogen atmosphere. The tube was subsequently capped and agitated in a bath maintained at a temperature of 0° C. for a period of eighteen hours. A methyl methacrylate-acrylonitrile copolymer product was formed and was precipitated by adding the cooled contents of the polymerization tube to about 100 milliliters of methanol. The precipitated copolymer was then filtered, washed with heptane and dried. In this manner, 0.5 gram of a methyl methacrylate-acrylonitrile copolymer was recovered. The copolymer product had a reduced viscosity of 1.17 as measured from a dimethylformamide soluiton containing 0.2 gram of the polymer per 100 milliliters of dimethylformamide at a temperature of 30° C., and contained 50 percent by weight of acrylonitrile as determined by nitrogen analysis.

*Example IV*

In a manner similar to that described in Example II, 0.3 gram of butylboron difluoride and 20 milliliters of acrylonitrile were charged to a polymerization tube under a nitrogen atmosphere. The tube was subsequently capped and agitated in a water bath maintained at a temperature of 27° C. for a period of about five minutes. A polyacrylonitrile product was formed and was precipitated by adding the cooled contents of the polymerization tube to about 100 milliliters of methanol. The precipitated polymer was then filtered, washed with methanol and dried. In this manner, a 13 percent yield of polyacrylonitrile was recovered. The product had a reduced viscosity of 3.68 as measured from a dimethylformamide solution containing 0.2 gram of the polymer per 100 milliliters of dimethylformamide at a temperature of 30° C.

This application is a continuation-in-part of copending applications Serial No. 775,366, filed November 21, 1958, and Serial No. 802,313, filed March 27, 1959, the latter of which is, in turn, a continuation-in-part of application, Serial No. 658,245, filed May 10, 1957, now abandoned.

What is claimed is:

1. A process for the polymerization of ethylenically unsaturated monomers having the general formula:

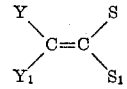

wherein Y and $Y_1$ each designate a member selected from the group consisting of hydrogen and halogen atoms, S designates a member of the group consisting of hydrogen atoms, halogen atoms and the alkyl radicals containing from one to four carbon atoms, $S_1$ designates a substituent having a positive Hammett para-sigma value of at least 0.3, and wherein when S designates an alkyl radical, $S_1$ designates a substituent having a positive Hammett para-sigma value of at least about 0.4, which process comprises contacting said ethylenically unsaturated monomer with a catalytic quantity, sufficient to polymerize said ethylenically unsaturated monomer, of an organoboron compound having the general formula:

$$BR_mX_n$$

wherein R designates a monovalent aliphatic hydrocarbon radical containing from one to twelve carbon atoms, X designates a halogen atom, $m$ is an integer of two and $n$ is an integer of one.

2. A process for the polymerization of ethylenically unsaturated monomers having the general formula:

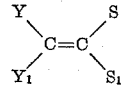

wherein Y and $Y_1$ each designates a member selected from the group consisting of hydrogen and halogen atoms, S designates a member of the group consisting of hydrogen atoms, halogen atoms and the alkyl radicals containing from one to four carbon atoms, $S_1$ designates a substituent having a positive Hammett para-sigma value of at least 0.3, and wherein when S designates an alkyl radical, $S_1$ designates a substituent having a positive Hammett para-sigma value of at least about 0.4, which process comprises contacting said ethylenically unsaturated monomer at a temperature of from about $-20°$ C. to about $200°$ C. with a catalytic quantity, sufficient to polymerize said ethylenically unsaturated monomer, of an organoboron compound having the general formula:

$$BR_mX_n$$

wherein R designates an acyclic alkyl radical containing from two to twelve carbon atoms, X designates a halogen atom, $m$ is an integer of two and $n$ is an integer of one.

3. The process of claim 2 wherein the temperature is from about 0° C. to about 100° C.

4. The process of claim 2 wherein the ethylenically unsaturated monomer is methyl methacrylate.

5. The process of claim 2 wherein the ethylenically unsaturated monomer is vinyl acetate.

6. The process of claim 2 wherein the ethylenically unsaturated monomer is acrylonitrile.

7. The process of claim 2 wherein X is of the general formula for the organoboron compound designates a chlorine atom.

8. The process of claim 2 wherein X of the general formula for the organoboron compound designates a fluorine atom.

9. A process for the production of poly(methyl methacrylate) which comprises contacting methyl methacrylate with from about 0.03 percent to about 5 percent by weight based upon said methyl methacrylate of di-n-butylboron chloride at a temperature of from about 0° C. to about 100° C.

10. A process for producing poly(vinyl acetate) which comprises contacting vinyl acetate with from about 0.03 percent to about 5 percent by weight based upon said vinyl acetate of di-n-butylboron chloride at a temperature of from about 0° C. to about 100° C.

11. A process for producing a copolymer of methyl methacrylate and acrylonitrile which comprises contacting a mixture of methyl methacrylate and acrylonitrile with from about 0.03 percent to about 5 percent by weight based upon said mixture of di-n-butylboron chloride at a temperature of about 0° C. to about 100° C.

References Cited in the file of this patent

UNITED STATES PATENTS 2,387,517    Kraus _____ Oct. 23, 1945

OTHER REFERENCES

Ashikari: Journal of Poly. Science 28, 641–2, April 1958.

Kolesnikow: Izvest, Akad. Nauk S.S.S.R., Ofedl Khim. Nauk (February 1957), pages 652–653.

Gould: Mechanism and Structure in Organic Chemistry, Henry Holt and Company, Inc., New York (1959), pages 220–227.